(No Model.)
J. P. BURNHAM.
MACHINE FOR TONGUING AND GROOVING ENDS OF FLOORING BOARDS.
No. 517,327. Patented Mar. 27, 1894.
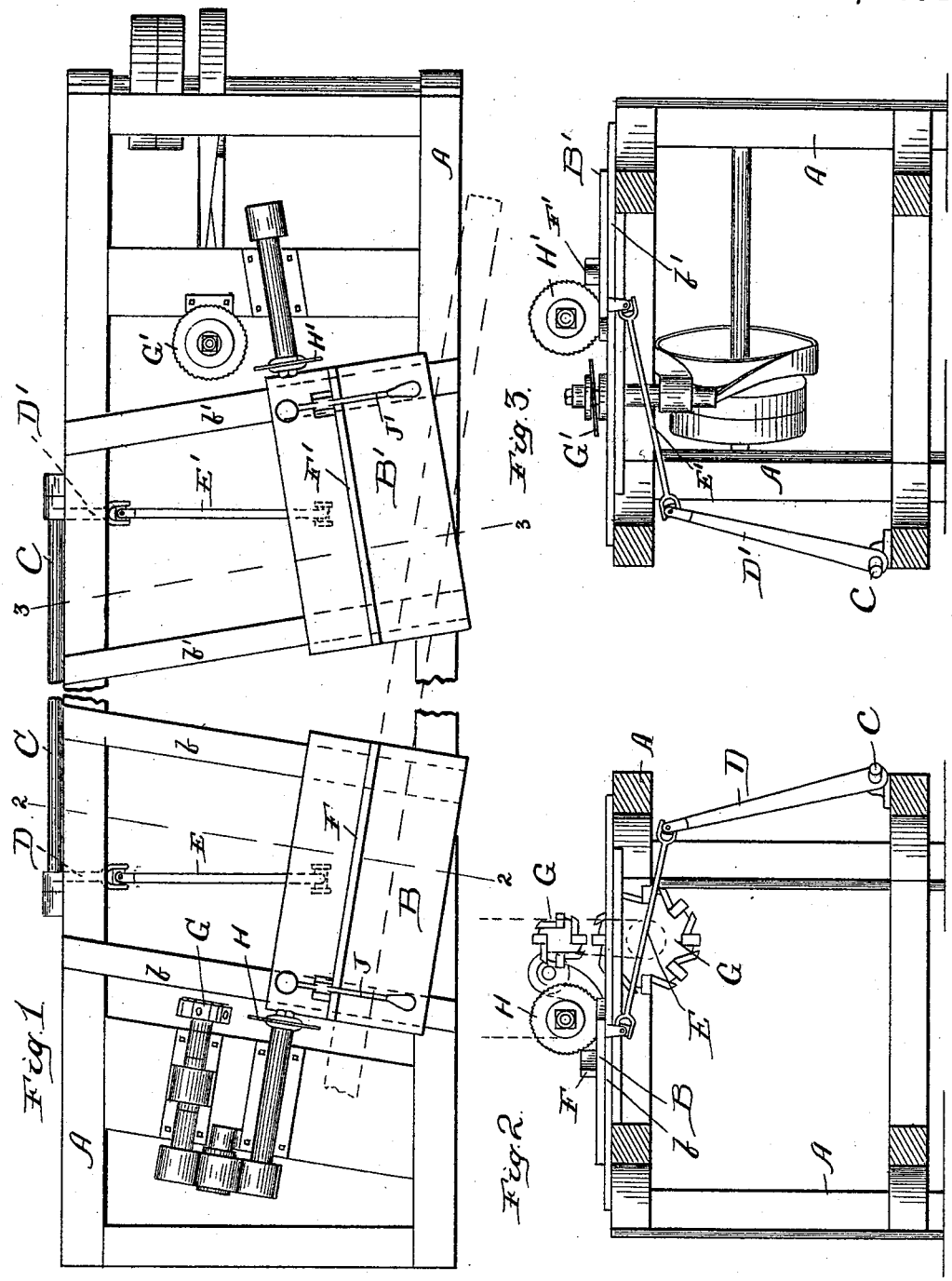
Witnesses:
Sew. E. Curtis
H. W. Munday
Inventor:
John P. Burnham.
By Munday, Evarts & Adcock,
His Attorneys.

UNITED STATES PATENT OFFICE.

JOHN P. BURNHAM, OF CHICAGO, ILLINOIS, ASSIGNOR TO THOMAS WILCE, OF SAME PLACE.

MACHINE FOR TONGUING AND GROOVING ENDS OF FLOORING-BOARDS.

SPECIFICATION forming part of Letters Patent No. 517,327, dated March 27, 1894.

Application filed November 15, 1893. Serial No. 490,973. (No model.)

*To all whom it may concern:*

Be it known that I, JOHN P. BURNHAM, a citizen of the United States, residing in Chicago, in the county of Cook and State of Illinois, have invented a new and useful Improvement in Machines for Tonguing and Grooving the Ends of Flooring-Boards, of which the following is a specification.

My invention relates to machines for tonguing and grooving the ends of flooring boards, and it consists in the novel combinations of parts and devices herein shown and described, and more particularly pointed out in the claims.

In the accompanying drawings, which form a part of this specification, and in which similar letters of reference indicate like parts, Figure 1 is a top or plan view of a machine embodying my invention. Fig. 2 is a cross section on the line 2—2 of Fig. 1, and Fig. 3 is a cross section on the line 3—3 of Fig. 1.

In the drawings A represents the frame work of the machine.

B B' are two sliding tables or carriages which slide on the ways b b, b' b'.

C is a rock shaft journaled on the frame and provided with the arms D D', the arm D being connected to the table B by the swivel bar E, and the arm D' to the table B' by the similar bar E', the arrangement and construction being such that when one of the tables is pushed transversely across the machine the other one will move correspondingly by reason of its connection through the rock shaft C. The sliding tables or carriages B B' it will be noticed are arranged to move across the machine at different angles, and each carriage or table is provided with a guide strip, as F F'. Upon the frame work at one end, and adjacent to the carriage, is mounted a pair of tonguing cutters G G, and a trimmer or cut off saw H. At the other end, and similarly situated, is a grooving saw G', preferably a wabble saw, and a trimmer or cut off saw H'. All of these cutting devices are of the well known rotary type, and each is provided with a suitable driving pulley. The two trimmers H H' and the two cutters G G, are driven from a counter shaft placed above the machine and not shown in the drawings, while the wabble saw or groover G' is driven from the counter shaft on the frame of the machine, as shown in Figs. 1 and 3. Weighted clamping handles J J', one for each of the carriages, serve to clamp and hold the board upon the carriage, as in some common forms of trimming cutters.

The operation is as follows: The machine being under motion, as to its revolving parts, the workman places the board to be treated upon the carriage B, as indicated in dotted lines, setting its edge up against the guide F and bringing down the clamping lever J pushes the carriage away from himself toward the saw H, which trims off the end, and he continues pushing until the board has passed through the tonguing cutters G G. He then draws the carriage back and operates on the other end of the board by swinging the board into position on the other carriage B' pushing it across into contact with the trimming saw H' and the grooving saw G', by which double operation one end of the board is cut with a tongue and the other end with a corresponding groove. It will be observed that the two carriages being arranged at an angle, the guides F F' are also upon the same angle to each other and, consequently, the end of the board not being operated upon may extend to any distance beyond the machine and yet not be brought into contact with the saws or cutters; and the two carriages being connected together through the rock shaft, the idle carriage moves with the operating one and is, therefore, at no time in its way.

This machine while operated partly by hand, is nevertheless capable of doing rapid work, and upon either short or long stuff.

I claim—

1. In a machine for tonguing and grooving the ends of flooring boards, the combination of a tongue cutting mechanism and a groove cutting mechanism set at an angle to each other, and two carriages one for the tonguing and the other for the grooving, set to move in similar angles and connected to move together, substantially as specified.

2. In a machine for tonguing and grooving the ends of flooring boards, the combination of a tongue cutting mechanism and a groove cutting mechanism set at an angle to each other, and two cut off saws placed for trimming the ends of the boards just previous to the tonguing and grooving operations, and two carriages one for the tonguing and the other for the grooving, set to move in similar angles and connected to move together, substantially as specified.

3. In a machine for tonguing and grooving the ends of flooring boards, the combination of the two carriages connected to move together at different angles, the stationary tongue cutters, and the stationary groove cutters, substantially as specified.

4. In a machine for tonguing and grooving the ends of flooring boards, the combination of the two carriages connected to move together at different angles, the stationary tongue cutters, the stationary groove cutters, and the cut off saws, substantially as specified.

JOHN P. BURNHAM.

Witnesses:
H. M. MUNDAY,
EMMA HACK.